US011876605B2

(12) United States Patent
Wang et al.

(10) Patent No.: US 11,876,605 B2
(45) Date of Patent: Jan. 16, 2024

(54) MITIGATING A LOCAL INTERFERENCE CONDITION CAUSED BY CONCURRENT TRANSMISSIONS IN A MULTI-RADIO ACCESS TECHNOLOGY AND MULTI-CONNECTIVITY ENVIRONMENT

(71) Applicant: Google LLC, Mountain View, CA (US)

(72) Inventors: Jibing Wang, San Jose, CA (US); Erik Richard Stauffer, Sunnyvale, CA (US); Aamir Akram, San Jose, CA (US)

(73) Assignee: Google LLC, Mountain View, CA (US)

(*) Notice: Subject to any disclaimer, the term of this patent is extended or adjusted under 35 U.S.C. 154(b) by 220 days.

(21) Appl. No.: 17/311,993

(22) PCT Filed: Dec. 12, 2019

(86) PCT No.: PCT/US2019/065853
§ 371 (c)(1),
(2) Date: Jun. 8, 2021

(87) PCT Pub. No.: WO2020/131542
PCT Pub. Date: Jun. 25, 2020

(65) Prior Publication Data
US 2022/0006551 A1    Jan. 6, 2022

Related U.S. Application Data

(60) Provisional application No. 62/784,226, filed on Dec. 21, 2018.

(51) Int. Cl.
H04W 72/04     (2023.01)
H04J 11/00     (2006.01)
(Continued)

(52) U.S. Cl.
CPC ........ H04J 11/005 (2013.01); H04L 27/2601 (2013.01); H04W 72/12 (2013.01); H04L 27/2626 (2013.01)

(58) Field of Classification Search
CPC ............... H04J 11/005; H04L 27/0008; H04L 27/2601; H04L 27/2626; H04L 5/0007; H04L 5/0041; H04L 5/0058; H04W 72/12
See application file for complete search history.

(56) References Cited

U.S. PATENT DOCUMENTS

2011/0158117 A1    6/2011  Ho et al.
2011/0158211 A1*   6/2011  Gaal ................... H04J 11/0023
                                                         375/260
(Continued)

FOREIGN PATENT DOCUMENTS

CN    108370577    8/2018
EP    2446598      5/2012
(Continued)

OTHER PUBLICATIONS

"International Preliminary Report on Patentability", Application No. PCT/US2019/065853, dated May 12, 2021, 7 pages.
(Continued)

Primary Examiner — Phuc H Tran
(74) Attorney, Agent, or Firm — Colby Nipper PLLC

(57) ABSTRACT

The present disclosure describes systems and methods directed to mitigating a local interference condition caused by concurrent transmissions in a multi-radio access technology and multi-connectivity environment. For a user equipment transmitting data in a multi-radio access technology/multi-connectivity environment, an interference manager application directs the user equipment to determine that an interference condition exists local to user equipment. The interference manager application directs the user equipment to determine a configuration of the user equipment wireless-communication hardware to mitigate the local interference condition and directs the user equipment to transmit a request message to a base station, causing the base station to configure wireless-communication hardware of the base
(Continued)

station to receive data transmitted by the user equipment in accordance with the determined configuration of the user equipment wireless-communication hardware that mitigates the determined local interference condition.

20 Claims, 7 Drawing Sheets

(51) Int. Cl.
*H04L 27/26* (2006.01)
*H04W 72/12* (2023.01)

(56) References Cited

U.S. PATENT DOCUMENTS

| | | | |
|---|---|---|---|
| 2011/0312288 | A1 | 12/2011 | Fu et al. |
| 2012/0164948 | A1 | 6/2012 | Narasimha et al. |
| 2012/0257519 | A1* | 10/2012 | Frank ............... H04L 5/143 370/252 |
| 2013/0303235 | A1 | 11/2013 | Zheng et al. |
| 2015/0055613 | A1 | 2/2015 | Palanki et al. |
| 2015/0195795 | A1 | 7/2015 | Loehr et al. |
| 2015/0215947 | A1 | 7/2015 | Kaukovuori et al. |
| 2016/0302209 | A1 | 10/2016 | Behravan et al. |
| 2016/0323832 | A1 | 11/2016 | Love et al. |
| 2017/0338850 | A1 | 11/2017 | Jain et al. |
| 2018/0270815 | A1 | 9/2018 | Bala et al. |
| 2019/0081657 | A1 | 3/2019 | Zeng et al. |
| 2020/0154442 | A1* | 5/2020 | Zhou ............... H04W 72/1215 |
| 2022/0006551 | A1* | 1/2022 | Wang ............... H04L 27/2601 |

FOREIGN PATENT DOCUMENTS

| | | |
|---|---|---|
| KR | 101289324 | 7/2013 |
| WO | 2019065634 | 4/2019 |
| WO | 2020131542 | 6/2020 |

OTHER PUBLICATIONS

"International Search Report and Written Opinion", PCT Application No. PCT/US2019/065853, dated Mar. 26, 2020, 40 pages.

"LTE; Evolved Universal Terrestrial Radio Access (E-UTRA); Medium Access Control (MAC) protocol specification (3GPP TS 36.321 version 15.8.0 Release 15)", ETSI TS 136 321 V15.8.0, Jan. 2020, 137 pages.

"Study on Signalling and Procedure for Interference Avoidance for In-Device Coexistence", 3GPP TR 36.816 V11.2.0 (Dec. 2011), 44 pages.

"Written Opinion", Application No. PCT/US2019/065853, dated Feb. 18, 2021, 7 pages.

"Written Opinion", PCT Application No. PCT/US2019/065853, dated Dec. 1, 2020, 6 pages.

Klingenbrunn, et al., "Power Backoff Mechanism for Intermodulation Distortion and Harmonic Distortion", Technical Disclosure Commons; Retrieved from https://www.tdcommons.org/dpubs_series/3424, Jul. 13, 2020, 13 pages.

* cited by examiner

500 ⟶

```
┌─────────────────────────────────────────────┐
│ Determine an interference condition that is local to a user │
│ equipment, the determined local interference condition │
│ that is attributable to a first configuration of wireless- │
│ communication hardware of a user equipment │
│                    502                      │
└─────────────────────────────────────────────┘
                      │
                      ▼
┌─────────────────────────────────────────────┐
│ Determine a second configuration of the     │
│ wireless-communication hardware of the user equipment that │
│ mitigates the determined, local interference condition │
│                    504                      │
└─────────────────────────────────────────────┘
                      │
                      ▼
┌─────────────────────────────────────────────┐
│ Transmit, to a base station, a request message │
│ having contents that cause the base station to configure wireless- │
│ communication hardware of the base station to │
│ receive data that is transmitted from the user equipment in │
│ accordance with the determined, second configuration of the │
│ wireless-communication hardware of the user equipment │
│                    506                      │
└─────────────────────────────────────────────┘
```

Fig. 5

MITIGATING A LOCAL INTERFERENCE CONDITION CAUSED BY CONCURRENT TRANSMISSIONS IN A MULTI-RADIO ACCESS TECHNOLOGY AND MULTI-CONNECTIVITY ENVIRONMENT

BACKGROUND

A user equipment (UE) may concurrently transmit different data using different radio access technologies (RATs). The concurrent transmission of the different data occurs in an environment that is referred to as a multi-radio access technology (MRAT)/multi-connectivity (MC) environment. In this environment, the UE may be connected to, and wirelessly communicate with, base stations each of which include hardware supporting wireless communications using one or more RATs.

As an example, a smart phone may be connected to a base station using a Third-Generation partnership project long-term evolution (3GPP LTE) RAT and also connected to the same base station using a Fifth-Generation new radio (5G NR) RAT. The smart phone may perform concurrent uplink transmissions to transmit, to the base station, mobility data using subcarriers of the 3GPP LTE RAT and video data using subcarriers of the 5G NR RAT.

In the multi-radio access technology and multi-connectivity environment, it is possible for intermodulation to occur between frequency components of the concurrent uplink transmissions. This intermodulation can be a bi-product of non-linearities that are inherent to radio transmitter components of the UE and may, in certain instances, form additional frequency components that interfere with subcarriers of the RATs associated with the concurrent uplink transmissions or with other subcarriers of the same or other RATs. This interference condition, which is local to the UE, may inhibit uplink transmissions from the UE as well as downlink transmissions to the UE. In certain instances, the interference condition may extend to other UE's that are proximate to the UE.

Continuing with the present example, while the smart phone is transmitting the mobility data using the subcarriers of the 3GPP LTE RAT and transmitting the video data using the subcarriers of the 5G NR RAT, intermodulation may occur such that additional frequency components form, which interfere with an uplink transmission of voice data from the smartphone to the base station using other subcarriers of the 5G NR RAT. Additional frequency components may also form that interfere with a downlink transmission from the base station to the smartphone, such a transmission of control plane data from the base station to the smart phone using other subcarriers of the 3GP LTE RAT.

To compound the problem even further, intermodulation may form yet more, additional frequency components that interfere with other subcarriers of other RATs, The other RATs may support wireless communications between the UE and other base stations or access points, such as subcarriers of a RAT that supports WLAN wireless communications between the smart phone and a router or access point, subcarriers of a RAT that supports global navigation satellite system (GNSS) wireless communications between the smart phone and a satellite for global positioning, or the like.

Although local to the user equipment, the described interferences may have impacts that are wide ranging to a radio access network. As an example, data contention or data losses resulting from the described interferences may be detrimental to data integrity and impact operations of the radio access network. In addition to this immediate compromise in effectiveness, the data contention or losses may lead to a compromise in efficiency due to a need to re-transmit the data, requiring additional power consumption on behalf of the user equipment and base stations of the radio access network, and also due to a need to a re-allocate subcarriers of the radio access network.

SUMMARY

This document describes systems and methods directed to mitigating a local interference condition caused by concurrent transmissions in a multi-radio access technology and multi-connectivity environment. For a user equipment transmitting data in a multi-radio access technology and multi-connectivity environment, an interference manager of the user equipment determines that an interference condition exists local to user equipment. The interference manager determines a configuration of the user equipment wireless-communication hardware to mitigate the local interference condition and causes the user equipment to transmit a request message to a base station. The request message causes the base station to configure wireless-communication hardware of the base station to receive data transmitted by the user equipment in accordance with the configuration of the user equipment wireless-communication hardware determined to mitigate the determined local interference condition.

In some aspects, a method performed by a user equipment is described. The method comprises the user equipment determining an interference condition that is local to the user equipment, where the local interference condition attributable to a first configuration of wireless-communication hardware of the user equipment that is used by the user equipment when concurrently transmitting first data from the user equipment to a base station using a first radio access technology and second data from the user equipment to the base station using a second radio access technology. As part of the method, the user equipment determines a second configuration of the wireless-communication hardware of the user equipment that mitigates the determined local interference condition and that is used by the user equipment when concurrently transmitting the first data from the user equipment to the base station using the first radio access technology and the second data from the user equipment to the base station using the second radio access technology. The method further comprises the user equipment transmitting, to the base station, a request message having contents that cause the base station to configure wireless-communication hardware of the base station to receive the first and second data transmitted by the user equipment in accordance with the determined, second configuration of the wireless-communication hardware of the user equipment.

In other aspects, a method performed by a base station is described. The method includes the base station receiving, from a user equipment, a request message. Based on the contents of the received request message, the base station configures wireless-communication hardware of the base station to receive first data transmitted by the user equipment using a first radio access technology and second data transmitted by the user equipment using a second radio access technology, where the first and second data concurrently transmitted by the user equipment in accordance with a second configuration of wireless-communication hardware of the user equipment that is determined, by the user equipment, to mitigate an transmission interference condition attributable to a first configuration of the wireless-communication hardware of the user equipment for transmitting, concurrently, the first data using the first radio access technology and the second data using the second radio access technology.

In yet other aspects, a user equipment is described. The user equipment comprises a first transceiver that is compatible with a first radio access technology, a second transceiver that is compatible with a second radio access technology, a processor, and a computer-readable storage media. The computer-readable storage media comprises an interference manager having instructions that, upon execution by the processor, cause the user equipment to determine an interference condition that is local to the user equipment. The local interference condition is attributable to a first wireless-communication hardware configuration of the user equipment that is used by the user equipment when concurrently transmitting first data to a first base station using a first radio access technology and second data to a second base station using a second radio access technology. The processor executing the instructions of the interference manager also causes the user equipment to determine a second configuration of the wireless-communication hardware that mitigates the determined local interference condition and that is used by the user equipment when concurrently transmitting (i) the first data from the user equipment to the base station using the first radio access technology and (ii) the second data from the user equipment to the base station using the second radio access technology. The processor executing the code of the interference manager also causes the user equipment to transmit a first request message to the first-base station that causes the first base station to configure wireless-communication hardware of the first base station to receive the first data transmitted by the first transceiver using the first radio access technology in accordance with the determined second configuration of the wireless-communication hardware of the user equipment. The execution of the code also causes the user equipment to transmit a second request message to the second base station that causes the second base station to configure wireless-communication hardware of the second base station to receive the second data transmitted by the second transceiver using the second radio access technology in accordance with the determined second configuration of the wireless-communication hardware of the user equipment.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects directed to adaptation of multi-radio access technology and multi-connectivity to mitigate local interferences is described below. The use of the same reference numbers in different instances in the description and the figures may indicate like elements.

FIG. 5 illustrates an example method performed by a user equipment mitigating a local interference condition caused by concurrent transmissions in a multi-radio access technology and multi-connectivity environment.

The following discussion describes examples of an operating environment, systems, methods, and signaling/control transactions that may be directed to mitigating a local interference condition caused by concurrent transmissions in a multi-radio access technology and multi-connectivity environment. In the context of the present disclosure, reference is made by way of example only.

Operating Environment

Figure 1:
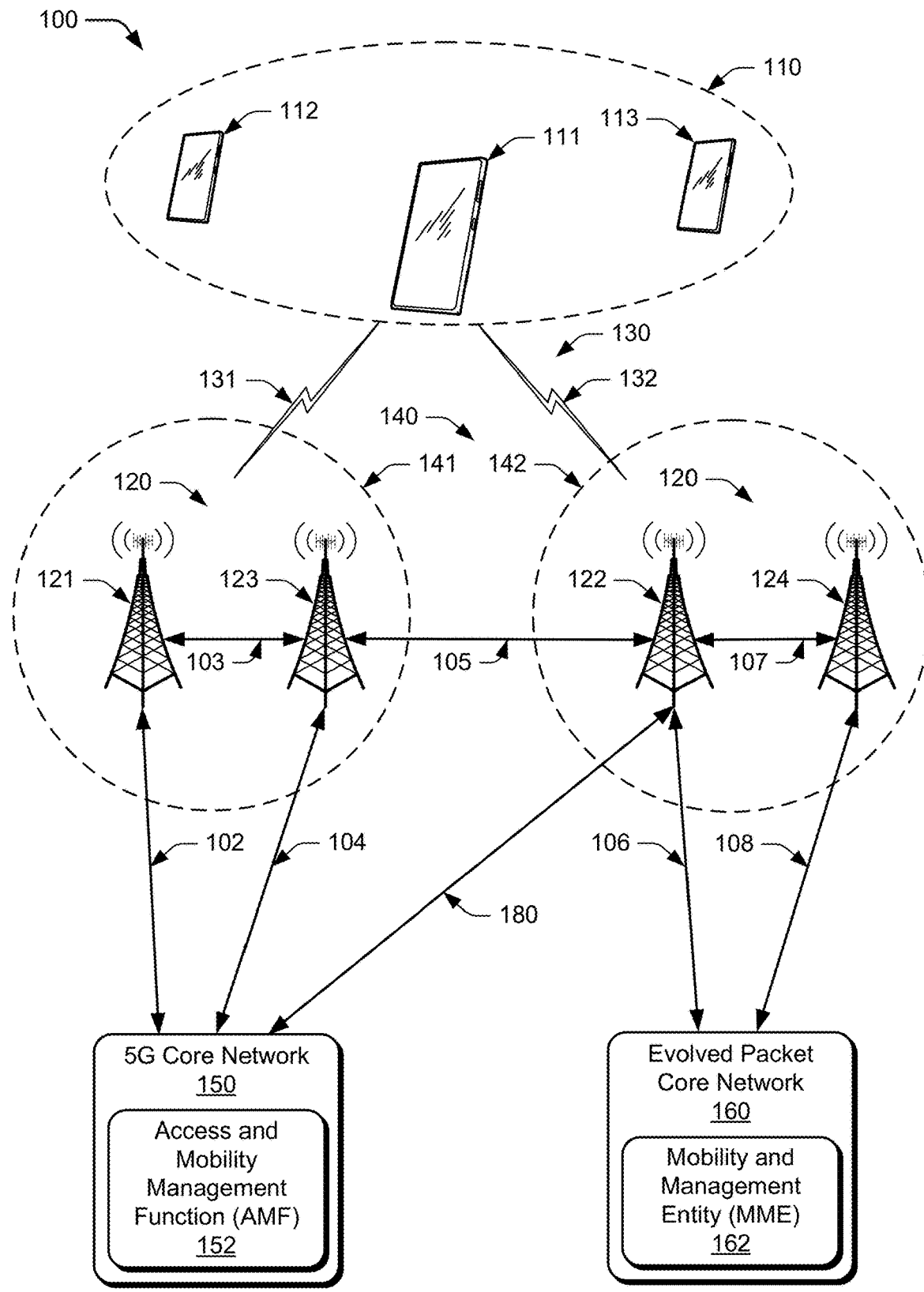
FIG. 1 illustrates an example operating environment in which various aspects of mitigating a local interference condition caused by concurrent transmissions in a multi-radio access technology and multi-connectivity environment are implemented.

FIG. 1 illustrates an example environment 100, which includes multiple user equipment 110 (UE 110), illustrated as UE 111, UE 112, and UE 113. Each UE 110 can communicate with base stations 120 (illustrated as base stations 121, 122, 123, and 124) through one or more wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, or the like, or any combination thereof.

The base stations 120 communicate with the UE 110 using the wireless links 131 and 132, which may be implemented as any suitable type of wireless link. The wireless links 131 and 132 include control and data communication, such as downlink of data and control information communicated from the base stations 120 to the UE 110, uplink of other data and control information communicated from the UE 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN or NR RAN). The RANs 140 are illustrated as an NR RAN 141 and an E-UTRAN 142. The base stations 121 and 123 in the NR RAN 141 are connected to a Fifth Generation Core 150 (5GC 150) network. The base stations 122 and 124 in the E-UTRAN 142 are connected to an Evolved Packet Core 160 (EPC 160). Optionally or additionally, the base station 122 may connect to both the 5GC 150 and EPC 160 networks.

The base stations 121 and 123 connect, at 102 and 104 respectively, to the 5GC 150 through an NG2 interface for control-plane signaling and using an NG3 interface for user-plane data communications. The base stations 122 and 124 connect, at 106 and 108 respectively, to the EPC 160 using an S1 interface for control-plane signaling and user-plane data communications. Optionally or additionally, if the base station 122 connects to the 5GC 150 and EPC 160 networks, the base station 122 connects to the 5GC 150 using an NG2 interface for control-plane signaling and through an NG3 interface for user-plane data communications, at 180.

In addition to connections to core networks, the base stations 120 may communicate with each other. For example, the base stations 121 and 123 communicate using an Xn Application Protocol (XnAP) through an Xn interface at 103, the base stations 122 and 123 communicate through an Xn interface at 105, and the base stations 122 and 124 communicate through an X2 interface at 107.

The 5GC 150 includes an Access and Mobility Management Function 152 (AMF 152), which provides control-plane functions, such as registration and authentication of multiple UE 110, authorization, and mobility management in the 5G NR network. The EPC 160 includes a Mobility Management Entity 162 (MME 162), which provides control-plane functions, such as registration and authentication of multiple UE 110, authorization, or mobility management in the E-UTRA network. The AMF 152 and the MME 162 communicate with the base stations 120 in the RANs 140 and also communicate with multiple UE 110, using the base stations 120.

Within the operating environment 100, a radio access technology (RAT) that uses resources, as defined by time and frequency domains associated with a wireless-communication protocol, may be associated to the wireless-communication protocol. For example, a radio access technology (RAT) using resources associated to the 3GPP LTE wireless communication-protocol may be termed a 3GPP LTE RAT while a radio access technology using resources associated to the 5G NR wireless-communication protocol may be termed a 5G NR RAT. These resources, in general, comprise subcarriers of the radio access technologies.

In instances of the operating environment 100, the UE 110 may be in a multi-connected state with the base station 120 (or a plurality of the base station(s) 120) using the wireless link(s) 130 associated with multiple RATS (depictions of several example, multi-connected states are illustrated and described by FIG. 4 below). While the UE 110 is in a multi-connected state and concurrently transmitting different data using the multiple RATS, non-linearities that may be inherent to radio transmitter components of the UE 110 (e.g., power supplies, oscillators, modulators, amplifiers, antennas, and antenna tuners) may cause intermodulation between subcarriers of the multiple RATS. This intermodulation may lead to an interference condition that is local to the UE 110 and that may interfere with not only subcarriers of the multiple RATs used to perform the concurrent transmissions, but also subcarriers of other RATs.

Continuing with the example of the UE 111, during the concurrent transmission of the first data to the base station 121 and the second data to the base station 122, intermodulation may occur between subcarriers of the 5G NR RAT and the 3GPP LTE RAT to cause an interference condition local to the UE 111. In addition to the local interference condition interfering with subcarriers associated with the 5G NR RAT and the 3GPP LTE RAT, the local interference condition may also interfere with other RATs, such as a WLAN RAT for wireless communications between the UE 111 and a router, a Bluetooth® RAT for wireless communications between the UE 111 and a laptop, or a Global Navigation Satellite System (GNSS) RAT for wireless communications between the UE 111 and a satellite.

In certain instances, and based on non-linearities that may be present in the radio transmitter components of the UE 110, the local interference condition can be attributed to a configuration of the wireless-communication hardware (e.g., the radio transmitter components) of the UE 110. The configuration of the wireless-communication hardware may cause the UE 110 to perform the concurrent transmissions using certain sets of subcarriers of the multiple RATs (e.g., the 5G NR RAT and the 3GPP LTE RAT), transmission beams achieved through beamforming, transmission duty cycles and patterns, transmission time intervals (TTIs), or transmission powers. In such instances, changing the configuration of the wireless-communication hardware may mitigate the local interference condition.

Systems

Figure 2:
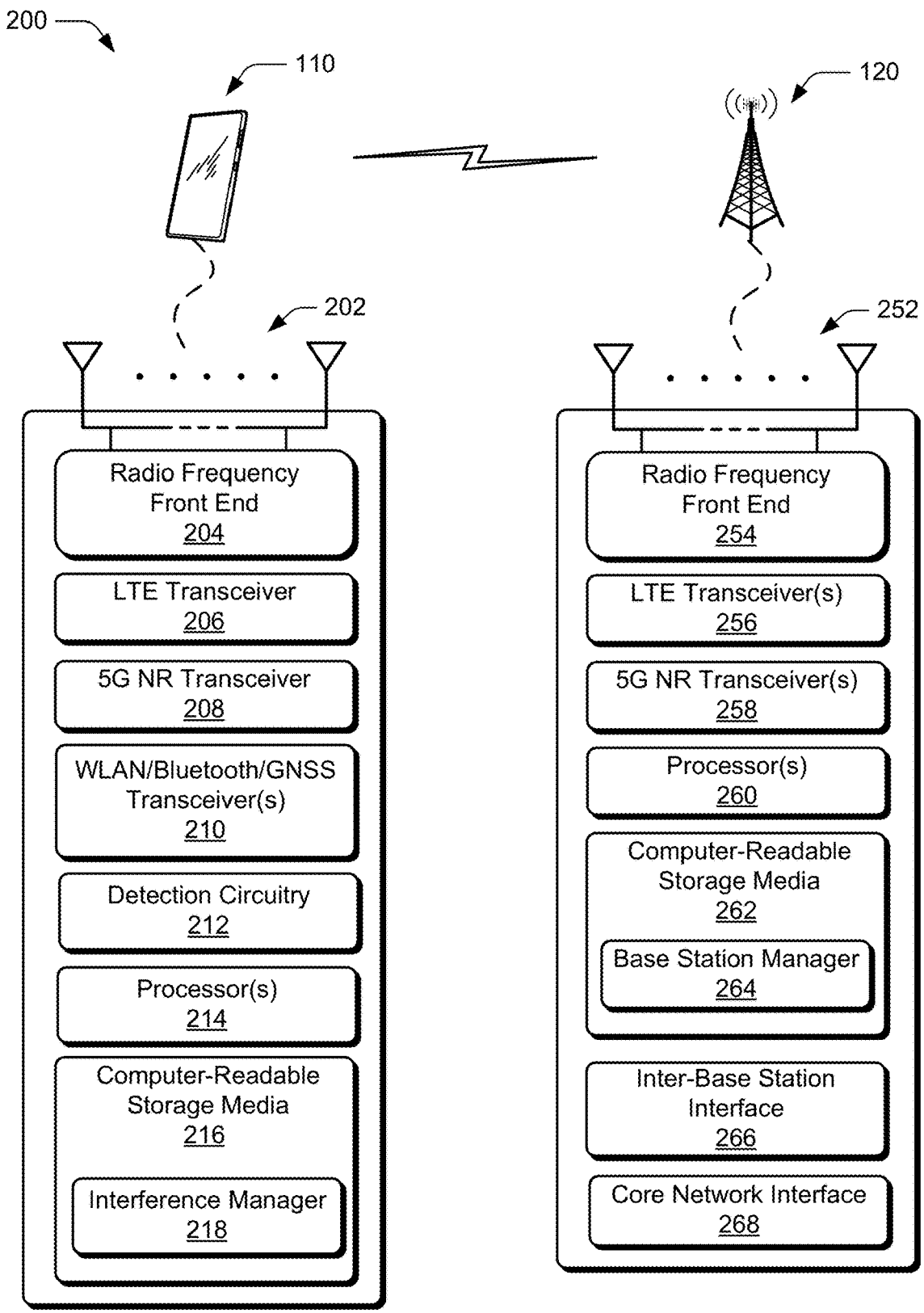
FIG. 2 illustrates example device diagrams in accordance with one or more aspects of mitigating a local interference condition caused by concurrent transmissions in a multi-radio access technology and multi-connectivity environment.

FIG. 2 illustrates example device diagrams 200 in accordance with one or more aspects of mitigating a local interference condition caused by concurrent transmissions in a multi-radio access technology and multi-connectivity environment including the multiple UE 110 and the base stations 120. The multiple UE 110 and the base stations 120 may include additional functions and interfaces that are omitted from FIG. 2 for the sake of clarity.

The UE 110 includes antennas 202, a radio frequency front end 204 (RF front end 204), an LTE transceiver 206 for communicating with the base station 120 using an LTE RAT and a 5G NR transceiver 208 for communicating with the base station 120 using a 5G NR RAT. The UE 110 may also include an additional WLAN/Bluetooth®/GNSS transceiver(s) 210 that may be used for communicating with another wireless-communication platform using another radio access technology, examples of which include a modem (e.g., a WLAN RAT), a laptop (e.g., a Bluetooth® RAT), or a satellite (e.g., a GNSS RAT). The RF front end 204 of the UE 110 can couple or connect the antennas 202 of the UE 110 to the LTE transceiver 206, the 5G NR transceiver 208, and the WLAN/Bluetooth®/GNSS transceiver(s) 210 to facilitate various types of wireless communication. The antennas 202 of the UE 110 may include an array of multiple antennas that are configured similar to or differently from each other. The antennas 202 and the RF front end 204 can be tuned to, and/or be tunable to, one or more frequency bands defined by the communication standards and implemented by the LTE transceiver 206, the 5G NR transceiver 208, and/or the WLAN/Bluetooth®/GNSS transceiver(s) 210. Additionally, the antennas 202, the RF front end 204, the LTE transceiver 206, and/or the 5G NR transceiver 208 may be configured to support beamforming for the transmission and reception of communications with the base stations 120.

The UE 110 also includes detection circuitry 212 that can monitor RAT subcarriers local to the UE 110 to detect an interference condition local to the UE 110. The detection circuitry 212 may include elements of a spectrum or signal analyzer that can be coupled to the antennas 202 and the RF front end 204. Furthermore, and in some instances, the detection circuitry 212 may not be separate but included in each, respective transceiver (e.g., the LTE transceiver 206 and the 5G NR transceiver 208).

The UE 110 also includes processor(s) 214 and computer-readable storage media 216 (CRM 216). The processor 214 may be a single core processor or a multiple core processor composed of a variety of materials, such as silicon, polysilicon, high-K dielectric, copper, and so on. The computer-readable storage media described herein excludes propagating signals. CRM 216 may include any suitable memory or storage device such as random-access memory (RAM), static RAM (SRAM), dynamic RAM (DRAM), non-volatile RAM (NVRAM), read-only memory (ROM), or Flash memory to store data at the UE 110.

The CRM 216 also includes an interference manager application 218 having executable code or instructions. Alternately or additionally, the interference manager application 218 may be implemented in whole or part as hardware logic or circuitry integrated with or separate from other components of the UE 110. In at least some aspects, the processor 214 executing the code or instructions of interference manager application 218 may, based on factors that include signal reception and transmission frequencies, signal transmission and reception timing, or nonlinearities of radio transmitter components of the user equipment, mathematically predict intermodulation that results in transmission interferences. The interference manager may further determine configurations of the wireless-communication hardware of the UE 110 (including the RF front end 204, the LTE transceiver 206, and/or the 5G NR transceiver 208) that mitigate the local interference condition.

The device diagram for the base stations 120, shown in FIG. 2, includes include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency bands defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base stations 120 also include processor(s) 260 and computer-readable storage media 262 (CRM 262). The processor 260 may be a single core processor or a multiple core processor composed of a variety of materials, such as silicon, polysilicon, high-K dielectric, or copper. The CRM 262 may include any suitable memory or storage device such as random-access memory (RAM), static RAM (SRAM), dynamic RAM (DRAM), non-volatile RAM (NVRAM), read-only memory (ROM), or Flash memory useable to store data at the base station 120.

The CRM 262 also includes an interference manager application 264. Alternately or additionally, the interference manager application 264 may be implemented in whole or part as hardware logic or circuitry integrated with or separate from other components of the base stations 120. In at least some aspects, the processor 260 executing the code or instructions of the interference manager application 264 configures the LTE transceivers 256 and the 5G NR transceivers 258 for communication with the UE 110, as well as communication with a core network, to perform the techniques described herein.

The base stations 120 include an inter-base station interface 266, such as an Xn and/or X2 interface, which the interference manager application 264 configures to exchange user-plane and control-plane data between another base station 120, to manage the communication of the base stations 120 with the UE 110. The base stations 120 include a core network interface 268 that the interference manager application 264 configures to exchange user-plane and control-plane data with core network functions and entities.

Figure 3:
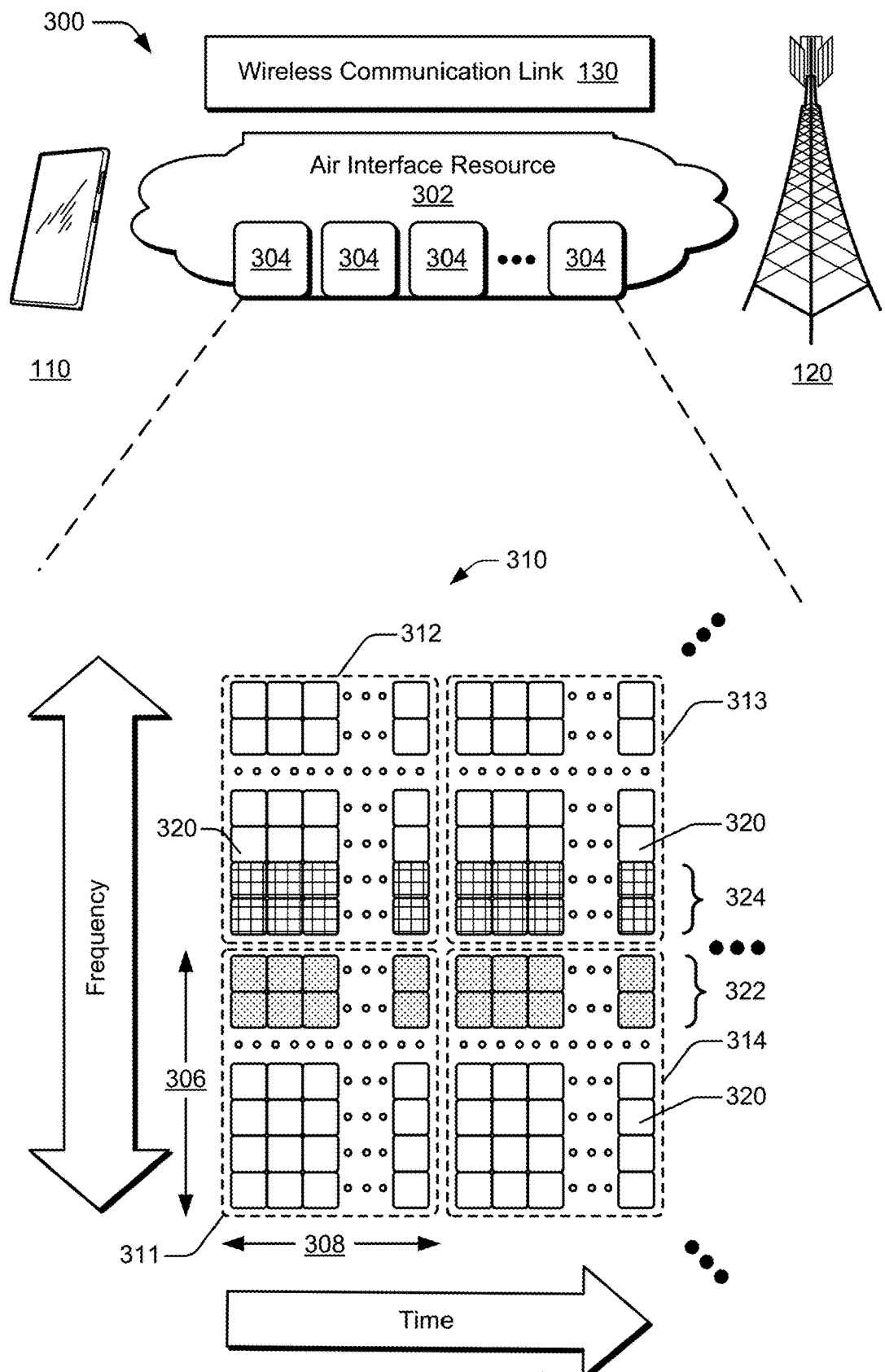
FIG. 3 illustrates an example air interface in accordance with one or more aspects of mitigating a local interference condition caused by concurrent transmissions in a multi-radio access technology and multi-connectivity environment.

FIG. 3 illustrates an example air interface 300 in accordance with one or more aspects of mitigating a local interference condition caused by concurrent transmissions in a multi-radio access technology and multi-connectivity environment. The air interface 300 can support the wireless links 130 of FIG. 1 in accordance with a wireless-communication protocol (e.g., a 3GPP LTE wireless-communication protocol or a 5G NR wireless-communication protocol) and, accordingly, be associated to a radio access technology (RAT) of the wireless-communication protocol.

The air interface resource 302 can be divided into resource units 304, each of which occupies some intersection of frequency spectrum and elapsed time. A portion of the air interface resource 302 is illustrated graphically in a grid or matrix having multiple resource blocks 310, including example resource blocks 311, 312, 313, 314. An example of a resource unit 304 therefore includes at least one resource block 310. As shown, time is depicted along the horizontal dimension as the abscissa axis, and frequency is depicted along the vertical dimension as the ordinate axis. The air interface resource 302, as defined by a given communication protocol or standard, may span any suitable specified frequency range, and/or may be divided into intervals of any specified duration. Increments of time can correspond to, for example, milliseconds (mSec). Increments of frequency can correspond to, for example, megahertz (MHz).

In example operations generally, the base station 120 allocates portions (e.g., resource units 304) of the air interface resource 302 for uplink and downlink communications. Each resource block 310 of network access resources may be allocated to support respective wireless-communication link 106 of multiple user equipment 110. In the lower left corner of the grid, the resource block 311 may span, as defined by a given communication protocol, a specified frequency range 306 and comprise multiple subcarriers or frequency sub-bands. The resource block 311 may include any suitable number of subcarriers (e.g., 12) that each correspond to a respective portion (e.g., 15 kHz) of the specified frequency range 306 (e.g., 180 kHz). The resource block 311 may also span, as defined by the given communication protocol, a specified time interval 308 or time slot (e.g., lasting approximately one-half millisecond or 7 orthogonal frequency-division multiplexing (OFDM) symbols). The time interval 308 includes subintervals that may each correspond to a symbol, such as an OFDM symbol. As shown in FIG. 3, each resource block 310 may include multiple resource elements 320 (REs) that correspond to, or are defined by, a subcarrier of the frequency range 306 and a subinterval (or symbol) of the time interval 308. Alternatively, a given resource element 320 may span more than one frequency subcarrier or symbol. Thus, a resource unit 304 may include at least one resource block 310, at least one resource element 320, and so forth.

In an example implementation, the UE 110 may concurrently transmit first and second data to the base station(s) 120 using wireless-communication hardware that is configured to transmit the first and second data using a set of subcarriers (e.g., resource elements corresponding to a frequency range), using a first set of subcarriers that includes subcarriers associated with a first RAT for the first data and subcarriers associated with a second RAT for the second data.

In instances of the example implementation, the UE 110 (e.g., the processor 214 executing the instructions or code of the interference manager application 218) may determine an interference condition that is local to the UE 110 and due to intermodulation resulting from the concurrent transmission of the first data and the second data using the first set of subcarriers. Determining that such an interference condition is due to the intermodulation may include monitoring and comparing a quality of a signal being received by the UE 110 while the UE 110 is performing uplink transmissions in a multi-connected state with the quality of the signal (e.g., the signal being received by the UE 110) while the UE 110 is performing uplink transmissions in a single-connected state.

To mitigate the local interference condition, the UE 110 may reconfigure wireless-communication hardware to transmit the second data using a second set of subcarriers. The second set of subcarriers, in this instance, includes subcarriers (associated with the first RAT and with the second RAT) that correspond to frequency ranges that are different than the frequency ranges of the first set of subcarriers. The respective frequency ranges of the first and second sets of subcarriers can be non-overlapping, i.e., the first and second sets do not contain any common subcarriers. The first and second sets of subcarriers can be selected such that intermodulation between subcarriers of the first and second sets does not cause local interference within one or more further frequency ranges used by the user equipment for uplink and/or downlink transmissions.

For example, and as illustrated in FIG. 3, the wireless-communication hardware of the UE 110 may be configured to a first configuration that transmits the first data using subcarriers 322. The subcarriers 322 are associated with a first RAT that may be, for example, a 5G NR RAT, and are part of a set of subcarriers that include subcarriers of a second RAT (details associated with the second data, second subcarriers, and second RAT are omitted for simplicity). Upon determining the interference condition that is local to the UE 110, the UE 110 may reconfigure the wireless-communication hardware of the UE 110 to a second wireless-hardware configuration that causes the UE 110 to transmit the first data and second data using a second set of subcarriers, where the first data is, in accordance with the second wireless-communication hardware configuration, transmitted using subcarriers 324. As illustrated, the subcarriers 324 are also associated with the first RAT (e.g., the example 5G NR RAT) but span a different frequency range than the subcarriers 322.

Figure 4:
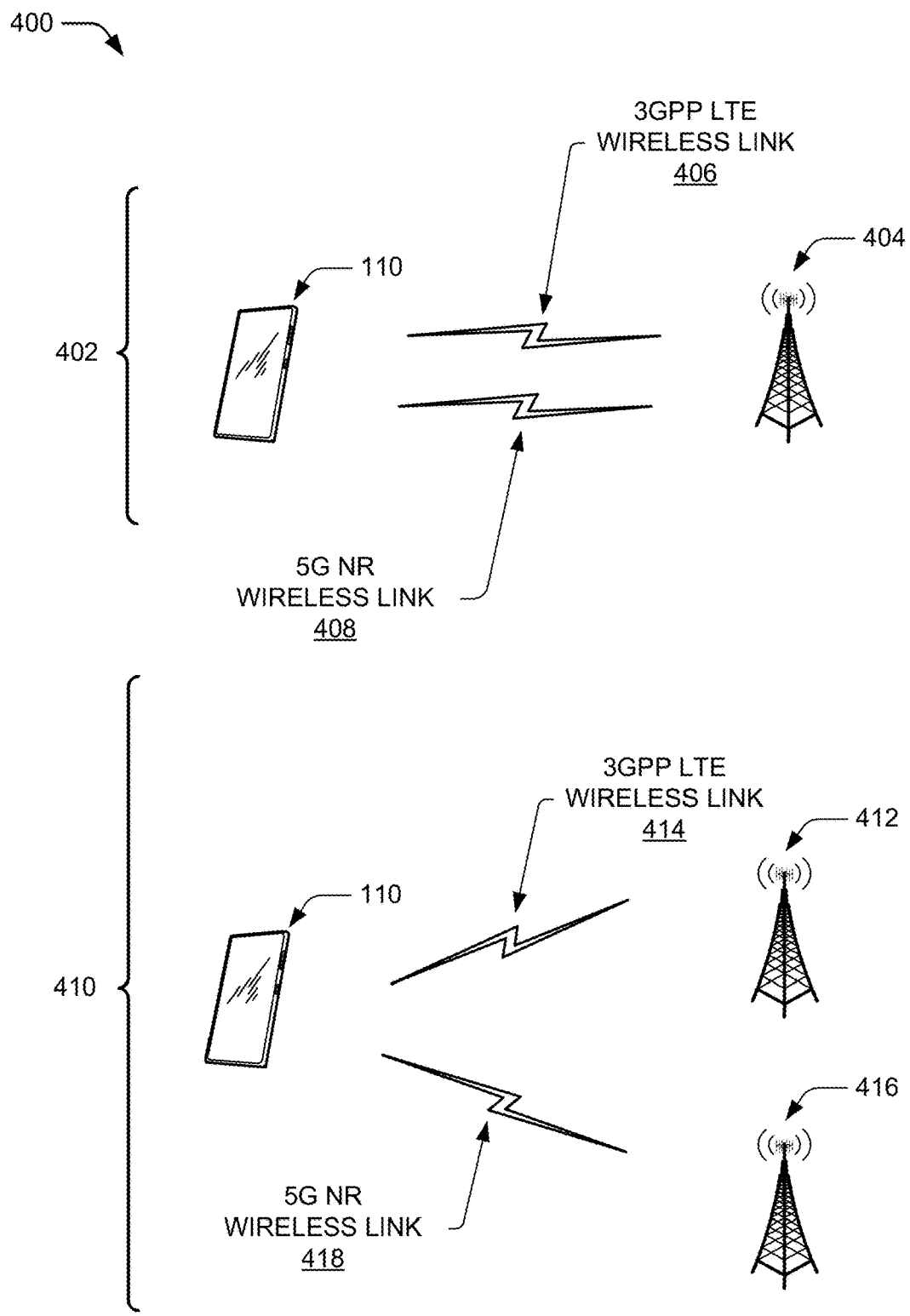
FIG. 4 illustrates example details of scenarios for mitigating a local interference condition caused by concurrent transmissions in a multi-radio access technology and multi-connectivity environment.

FIG. 4 illustrates example details 400 of scenarios of mitigating a local interference condition caused by concurrent transmissions in a multi-radio access technology and multi-connectivity environment. Scenario 402 illustrates a first example scenario of multi-radio access technology being used for multi-connectivity, where the UE 110 is dually-connected to a base station 404 using two radio access technologies (RATs). The UE 110 is connected to the base station 404 using a first RAT (a 3GPP LTE RAT) using a 3GPP LTE wireless link 406. The UE 110 is also connected to the base station 404 using a second RAT (a 5G NR RAT) using a 5G NR wireless link 408. Each link may allow concurrent transmissions from the UE 110 to base station 404 in accordance with respective, wireless-communication protocols.

Scenario 410 illustrates a second example scenario of multi-radio access technology being used for multi-connectivity, where the UE 110 is connected to a first base station 412 using a first RAT (a 3GPP LTE RAT) using a 3GPP LTE wireless link 414. Also, the UE 110 is connected to a second base station 416 using a second RAT (a 5G NR RAT) using a 5G NR wireless link 418. The links may support concurrent transmissions from the UE 110 to the base stations 412 and 416 in accordance with respective, wireless-communication protocols. In general, the scenarios 402 and 410 may each yield an interference condition (due to intermodulation during concurrent transmissions) that is local to the UE 110.

Methods

FIG. 5 illustrates an example method 500 performed by a user equipment to mitigate a local interference condition caused by concurrent transmissions in a multi-radio access technology and multi-connectivity environment. The method 500 may be performed by the UE 110 (e.g., the processor 214 executing the code of the interference manager application 218). Furthermore, the method 500 may be performed in accordance with the UE 110 being dually-connected to a base station, such as the base station 404 of the scenario 402 of FIG. 4.

At operation 502, the user equipment determines an interference condition that is local to the user equipment, where the local interference condition is attributable to (in other words, is caused by or is a consequence of) a first configuration of wireless-communication hardware of the user equipment. The first configuration is used by the user equipment when concurrently transmitting first data from the user equipment to a base station using a first radio access technology and second data from the user equipment to the base station using a second radio access technology.

In some instances and at 502, the user equipment may determine the local interference condition with the aid of detection circuitry local to the user equipment (e.g., the detection circuitry 212). The user equipment may also, as part of determining the local interference condition, compute and project the local interference condition based on data and algorithms stored at the user equipment (e.g., within the interference manager application 218). As an example, the data and algorithms may take into account harmonics of frequencies or known nonlinearities of radio transmitter components of the user equipment.

Furthermore, and at 502, the first configuration of the wireless-communication hardware may cause the user equipment to transmit the first and second data using a first set of subcarriers, where the first set of subcarriers includes subcarriers of the first radio access technology and subcarriers of the second radio access technology. The determined local interference condition may be a condition that interferes with wireless communications that are transmitted to the user equipment using a third radio access technology that different than the first and second radio access technologies. As an example, the first radio access technology may be a Fifth-Generation new radio (5G NR) radio access technology, the second radio access technology may be a Third-Generation partnership project long-term evolution (3GPP LTE) radio access technology, and the third radio access technology may be a WLAN, a Bluetooth®, or Global Navigation Satellite System radio access technology. Transmission and reception by the UE 110 would be performed with the aid of respective transceivers of the UE 110 (e.g., the LTE transceiver 206, the 5G NR transceiver 208, and the WLAN/Bluetooth/GNSS transceiver 210).

At operation 504, the user equipment determines a second configuration of the wireless-communication hardware of the user equipment. The second configuration is used by the user equipment when concurrently transmitting the first data from the user equipment to the base station using the first radio access technology and the second data from the user equipment to the base station using the second radio access technology. The determined, second configuration of the wireless-communication hardware of the user equipment mitigates the determined local interference condition. As an example, a mathematical calculation may determine that a third order intermodulation of uplink transmissions made by the user equipment (e.g., the user equipment in a multi-connected state) does not fall into a frequency range of downlink transmissions to the user equipment. As another example, a mathematical calculation may determine that third order harmonics of uplink transmissions made by the user equipment (e.g., the user equipment in a multi-connected state) do not fall into a frequency range of the downlink transmissions to the user equipment.

Furthermore, and at 504, the interference manager application 218 selects the second configuration of the wireless-communication hardware to use a second set of respective subcarriers that is different than the first set of respective subcarriers to transmit the first and second data, where the second set of respective subcarriers includes subcarriers of the first radio access technology and subcarriers of the second radio access technology. The second configuration of the wireless-communication hardware may cause the user equipment to transmit the first and second data using transmission duty cycles and/or patterns, beamforming parameters, transmission time intervals, or transmission-power parameters that are different than those of the first configuration of the wireless-communication hardware. The transmission duty cycles, transmission patterns, beamforming parameters, transmission time intervals and/or transmission-power parameters can be selected to reduce or eliminate local interference with one or more other uplink and/or downlink transmissions at the user equipment. Appropriate selection of any of the aforementioned parameters can, in combination appropriate selection of subcarriers, can substantially reduce or eliminate local interference when the wireless-communication hardware of the user equipment is in the second configuration.

At operation 506, the user equipment transmits to the base station a request message having contents that request the base station to configure wireless-communication hardware of the base station to receive the first and second data transmitted by the user equipment in accordance with the determined, second configuration of the wireless-communication hardware of the user equipment. The request message may be a single request message or a combination of multiple request messages. As examples, the single request message may be transmitted using a physical uplink control channel (PUCCH) associated with a 5G NR RAT or the combination of multiple request messages may be transmitted by ways of physical uplink control channels (PUCCHs) associated with a 5G NR RAT and a 3GPP LTE RAT.

At operation 506, the contents may include subcarrier scheduling parameters (e.g., for needs related to scheduling and allocation of the second set of subcarriers), transmission duty cycles and patterns, beamforming parameters, transmission time intervals, and transmission-power parameters.

Figure 6:
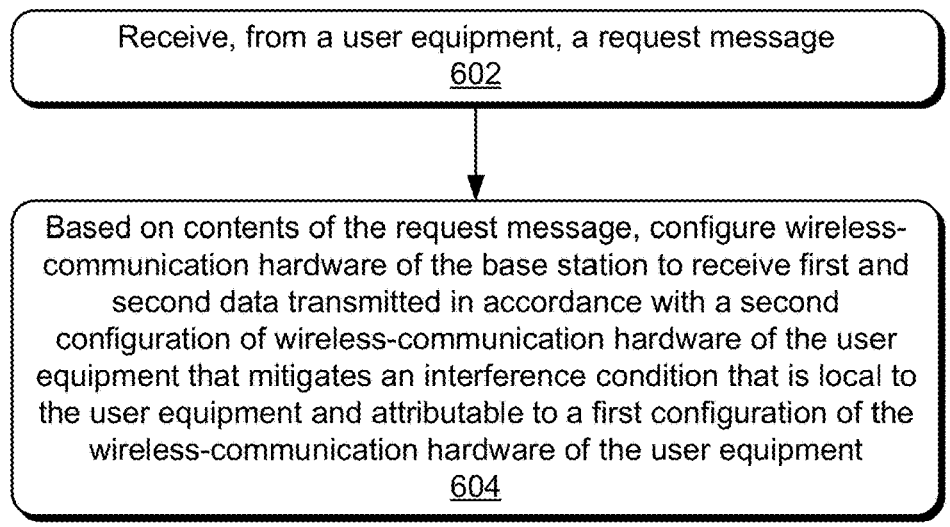
FIG. 6 illustrates an example method performed by a base station mitigating a local interference condition caused by concurrent transmissions in a multi-radio access technology and multi-connectivity environment.

FIG. 6 illustrates an example method 600 performed by a base station to mitigate a local interference condition caused by concurrent transmissions in a multi-radio access technology and multi-connectivity environment. The method 600 may be performed by the base station 404 of the scenario 402 of FIG. 4 (e.g., the processor 260 executing the code of the interference manager application 264).

At operation 602 the base station receives a request message from the user equipment.

At operation 604, and based on contents of the request message, the base station configures wireless-communication hardware of the base station to receive first data transmitted by the user equipment using a first radio access technology and second data transmitted by the user equipment using a second radio access technology, where the first and second data are concurrently transmitted by the user equipment in accordance with a second configuration of wireless-communication hardware of the user equipment that is determined, by the user equipment, to mitigate an interference condition that is local to the user equipment. The interference condition is attributable to a first configuration of the wireless-communication hardware of the user equipment for transmitting, concurrently, the first data using the first radio access technology and the second data using the second radio access technology.

Contents of the request message may include subcarrier scheduling parameters (e.g., for needs related to scheduling and allocation of the second set of subcarriers), transmission duty cycles and patterns, beamforming parameters, transmission time intervals, and transmission-power parameters. Furthermore, the base station may share the contents of the request message with other base stations to manage wireless communications across respective radio access networks.

Variations of methods 500 and 600 may, in certain instances, include additional operations that encompass negotiations between the user equipment and the base station. As a first example of such additional operations, and in response to receiving the request message, the base station may determine that configuring its wireless communication hardware to receive the data that is transmitted from the user equipment in accordance with the determined, second configuration of the user equipment is not possible and transmit, to the user equipment, a response message that includes an indication that the determined, second configuration is rejected by the base station.

As a second example of additional operations, in response to receiving the request message, the base station may determine that the determined, second configuration of the user equipment cannot be supported by the base station or that an alternative configuration would result in more efficient scheduling of resources for the base station. The base station may determine alternate wireless-communication parameters (e.g., subcarriers, transmission duty cycles and patterns, beam forming parameters, or transmission power parameters) that correspond to a third configuration of the wireless-communication hardware of the user equipment, and transmit a response message that includes the determined, alternate wireless-communication parameters. The response message may include an indication that the determined, second configuration is rejected by the base station or the presence of the alternate wireless-communication parameters in the response message indicates to the user equipment that the base station rejected the determined, second configuration. The user equipment may, in turn, accept the parameters (and reconfigure its hardware accordingly to the third configuration), deny the parameters, or accept and deny respective portions of the parameters. Additionally, the user equipment and base station may exchange additional request and response messages to negotiate a configuration that is acceptable to both the base station and the user equipment.

Signaling and Control Transactions

Figure 7:
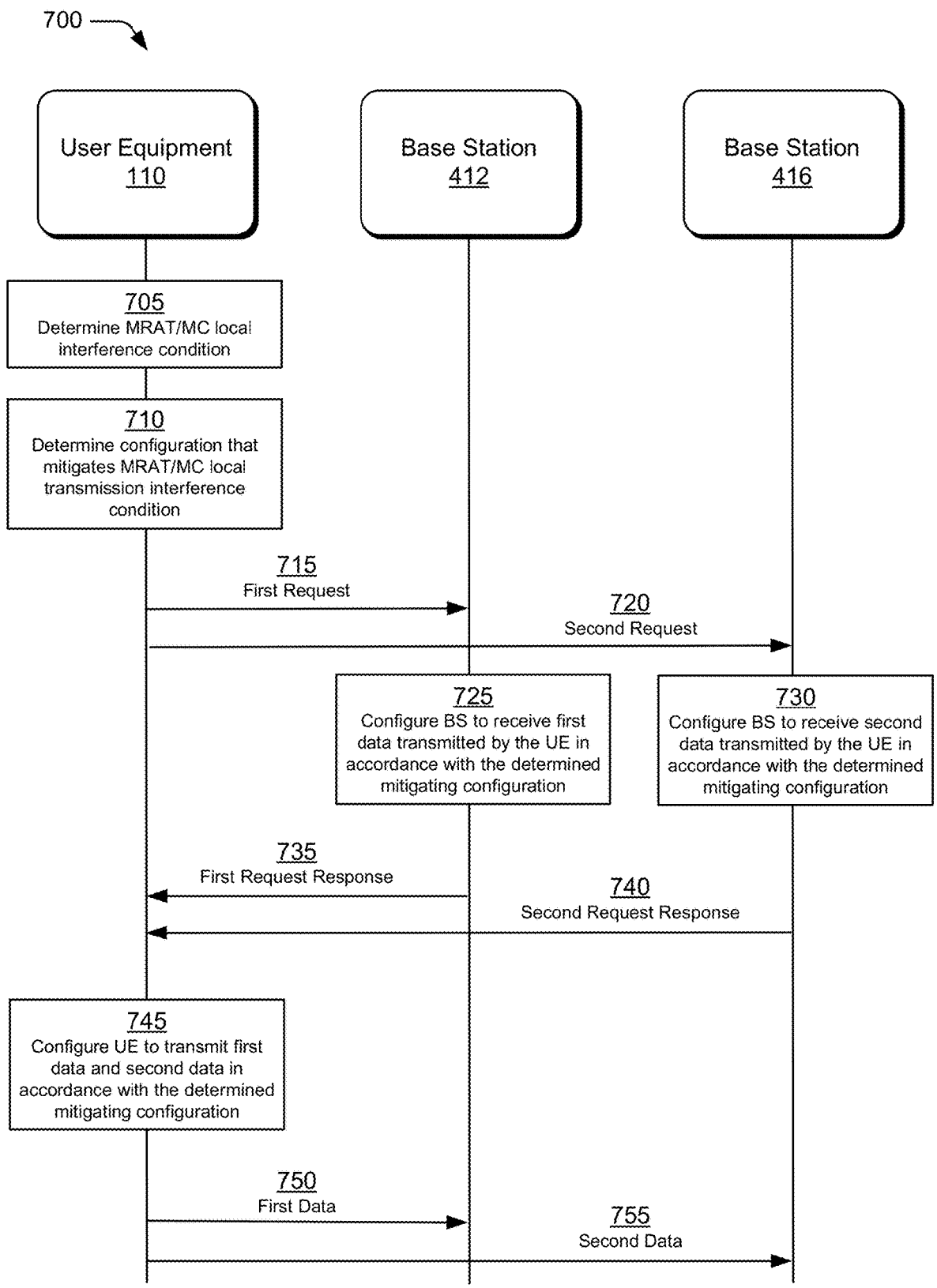
FIG. 7 illustrates example details of signal and control transactions associated with mitigating a local interference condition caused by concurrent transmissions in a multi-radio access technology and multi-connectivity environment.

FIG. 7 illustrates example details 700 of signal and control transactions associated with mitigating a local interference condition caused by concurrent transmissions in a multi-radio access technology and multi-connectivity environment. The example details 700 may be associated with the scenario 410 of FIG. 4 (e.g., the UE 110 connected to the base station 412 using the 3GPP LTE wireless link 414 and connected to the base station 416 using the 5G NR wireless link 418).

The UE 110 determines, at 705, an interference condition that is local to the UE 110 and at 710 determines a wireless-communication hardware configuration that mitigates the local interference condition. At 715 the UE 110 transmits a first request message to the base station 412. In the context of the present example, the request message may be transmitted using a 3GPP LTE physical uplink control channel (PUCCH) and have contents associated with the determined wireless-communication hardware configuration at 710 that include parameters related to an upcoming transmission of first data from the UE 110 to the base station 412, including transmission duty cycles and patterns, beamforming parameters, transmission time intervals, and transmission-power parameters. As another example, the message may be embedded in a file containing the data to be transmitted, in which instance such contents may be included as part of a header, data frame, or data packet that is part of the file.

At 720, the UE 110 transmits a second request message to the base station 416. In the context of the present example, the request message is transmitted using a 5G NR physical uplink control channel (PUCCH) and have contents that include parameters related to an upcoming of transmission of second data from the UE 110 to the base station 416, including transmission duty cycles and patterns, beamforming parameters, transmission time intervals, and transmission-power parameters.

At 725 and 730, the base station 412 and the base station 416 respectively determine that wireless communications with the UE 110 may be performed in accordance with the first and second request messages and configure their wireless communication hardware to perform the operations. At 735, the base station 412 transmits to the UE 110 a first response message that includes an indication that the base station 412 has accepted the configuration of parameters included in the first request message. At 740, base station 416 transmits a second response message to the UE 110 includes an indication that the base station 416 has accepted the configuration of parameters included in the second request message At 745, and upon receiving the response messages, the UE 110 configures wireless-communication hardware of the UE 110 to perform uplink transmissions in accordance with determined configuration. At 750, the UE 110 transmits the first data to the base station 412 using the 3GPP LTE wireless link 414 (e.g., using a 3GPP LTE RAT) while at 755 the UE 110 transmits the second data to the base station 416 using the 5G NR wireless link 418 (e.g., using a 5G NR RAT).

Variations in the example signaling and control transactions include determinations and signaling by one or both of the base stations (e.g., the base station 410 and the base station 414) associated with negotiating or commanding parameters that influence configuration of wireless-communication hardware of the base stations (e.g., the base station 412 or the base station 416) and/or the UE 110. In such instances, one or both of the base stations may determine that they cannot accommodate requests of the UE 110 and instead transmit response messages that include parameters influencing configurations of the wireless-communication hardware that may be part of the base stations and/or the UE 110.

The described signaling and control transactions are using example only and are not constrained by the sequence or order of presentation unless otherwise noted. Furthermore, in certain aspects, additional signaling and control transactions may augment or replace the described signaling and control transactions.

Variations

Variations and permutations of the aforementioned methods and systems are many. Consider, for example, multi-connectivity using more than two radio access technologies. Although descriptions above include permutations of a user equipment that is dually-connected to a base station (or to two base stations) using two radio access technologies, the user equipment may be connected to a base station (or to three base stations) using three radio access technologies such as a 3GPP LTE RAT, a 5G NR RAT, and a Sixth-Generation (6G) RAT. In such an instance, the user equipment would include a transceiver that supports the 6G RAT. In general, the techniques are scalable beyond a dual-RAT, dual-connectivity environment.

Although techniques and apparatuses mitigating a local interference condition caused by concurrent transmissions in a multi-radio access technology and multi-connectivity environment are described, it is to be understood that the subject of the appended claims is not necessarily limited to the specific features or methods described. Rather, the specific features and methods are disclosed as example ways in which mitigating a local interference condition caused by concurrent transmissions in a multi-radio access technology and multi-connectivity environment can be implemented.

EXAMPLES

The following paragraphs recite several examples:

Example 1: A method performed by a user equipment, the method comprising: determining, by the user equipment, an interference condition that is local to the user equipment, the determined local interference condition attributable to a first configuration of wireless-communication hardware of the user equipment that is used by the user equipment when concurrently transmitting: first data from the user equipment to a base station using a first set of subcarriers, the first set of subcarriers associated with a first radio access technology; and second data from the user equipment to the base station using a second set of subcarriers, the second set of subcarriers associated with a second radio access technology; determining, by the user equipment, a second configuration of the wireless-communication hardware of the user equipment that mitigates the determined local interference condition and that is used by the user equipment, the determining when concurrently transmitting: the first data from the user equipment to the base station using a third set of subcarriers, the third set of subcarriers associated with the first radio access technology and different from the first set of subcarriers; and the second data from the user equipment to the base station using a fourth set of subcarriers, the fourth set of subcarriers associated with the second radio access technology and different from the second set of subcarriers; and transmitting, by the user equipment and to the base station, a request message having contents that cause the base station to configure wireless-communication hardware of the base station to receive the first data and the second data transmitted by the user equipment in accordance with the determined, second configuration of the wireless-communication hardware of the user equipment.

Example 2: The method as recited by example 1, wherein the determined local interference condition is one which interferes with wireless communications that are transmitted to the user equipment using a third radio access technology that is other than the first radio access technology and other than the second radio access technology.

Example 3: The method as recited by example 1 or example 2, wherein the determined second configuration of the wireless-communication hardware directs the user equipment to transmit the first and second data using transmission duty cycles and patterns that are different than those directed by the first configuration of the wireless-communication hardware.

Example 4: The method as recited by any of examples 1 to 3 wherein the determined second configuration of the wireless-communication hardware directs the user equipment to transmit the first and second data using beamforming parameters that are different than those directed by the first configuration of the wireless-communication hardware.

Example 5: The method as recited by any of examples 1 to 4, wherein the determined second configuration of the wireless-communication hardware directs the user equipment to transmit the first and second data using transmission-power parameters that are different than those directed by the first configuration of the wireless-communication hardware.

Example 6: The method as recited by any of examples 1 to 5, wherein the determined second configuration of the wireless-communication hardware directs the user equipment to transmit the first and second data using different transmission time intervals than those directed by the first configuration of the wireless-communication hardware.

Example 7: The method as recited by any of examples 1 to 6, wherein determining the local interference condition includes computing the local interference condition based on algorithms stored in the user equipment.

Example 8: The method as recited by example 7, wherein the algorithms account for harmonics, frequencies, or known nonlinearities of the user equipment.

Example 9: The method as recited by any of examples 1 to 8, wherein determining the second configuration of the wireless-communication hardware includes determining that a third order intermodulation of uplink transmissions made by the user equipment does not fall into a frequency range of downlink transmissions to the user equipment.

Example 10: The method as recited by any of the claims 1 to 8, wherein determining the second configuration of the wireless-communication hardware includes determining that third order harmonics of uplink transmissions made by the user equipment do not fall into a frequency range of downlink transmissions to the user equipment.

Example 11: A method performed by a base station, the method comprising: receiving, by the base station and from a user equipment, a request message; configuring, by the base station and based on contents of the request message, wireless-communication hardware of the base station to receive first data transmitted by the user equipment using a first radio access technology and second data transmitted by the user equipment using a second radio access technology, the first and second data: concurrently transmitted by the user equipment in accordance with a second configuration of wireless-communication hardware of the user equipment that is determined, by the user equipment, to mitigate an interference condition that is local to the user equipment; and attributable to a first configuration of the wireless-communication hardware of the user equipment for transmitting, concurrently, the first data using the first radio access technology and the second data using the second radio access technology; and transmitting, by the base station to another base station, the contents of the request message.

Example 12: The method as recited by example 11, wherein the contents of the request message include radio access technology subcarrier scheduling parameters which cause the base station to schedule and allocate radio access technology subcarriers to receive, from the user equipment, the first and second data concurrently transmitted by the user equipment in accordance with the second configuration.

Example 13: The method as recited by example 11 or example 12, wherein the contents of the request message include beamforming parameters for the base station to receive, from the user equipment, the first and second data transmitted by the user equipment in accordance with the second configuration.

Example 14: A user equipment comprising: a processor and a computer-readable storage media storing instructions of an interference manager application that, when executed by the processor, directs the user equipment to perform any method of examples 1 to 10.

Example 15: A base station comprising: a processor and a computer-readable storage media storing instructions of a base station manager application that, when executed by the processor, directs the base station to perform any method of examples 11 to 13.

What is claimed is:

1. A method performed by a user equipment, the method comprising:
   determining, by the user equipment, an interference condition that is local to the user equipment, the determined local interference condition attributable to a first configuration of wireless-communication hardware of the user equipment that is used by the user equipment when concurrently transmitting:
      first data from the user equipment to a first base station using a first set of subcarriers, the first set of subcarriers associated with a first radio access technology; and
      second data from the user equipment to a second base station using a second set of subcarriers, the second set of subcarriers associated with a second radio access technology;
   determining, by the user equipment, a second configuration of the wireless-communication hardware of the user equipment that mitigates the determined local interference condition caused by signals produced by the first configuration, and that is used by the user equipment, the determining when concurrently transmitting:

the first data from the user equipment to the first base station using a third set of subcarriers, the third set of subcarriers associated with the first radio access technology and different from the first set of subcarriers; and the second data from the user equipment to the second base station using a fourth set of subcarriers, the fourth set of subcarriers associated with the second radio access technology and different from the second set of subcarriers; and transmitting, by the user equipment and to the first base station and the second base station, a request message having contents that indicate to the first base station and the second base station one or more of a duty cycle, a transmission pattern, or a transmission time interval that the user equipment will use when transmitting the first data using the third set of subcarriers and the second data using the fourth set of subcarriers.

2. The method as recited by claim 1, wherein the determined local interference condition is one which interferes with wireless communications that are transmitted to the user equipment using a third radio access technology that is other than the first radio access technology and other than the second radio access technology.

3. The method as recited by claim 1, wherein the contents further indicate to the first and/or the second base station beamforming parameters that the user equipment will use when transmitting the first data using the third set of subcarriers and the second data using the fourth set of subcarriers.

4. The method as recited by claim 1, wherein the determined second configuration of the wireless-communication hardware directs the user equipment to transmit the first data and the second data using transmission-power parameters that are different than those directed by the first configuration of the wireless-communication hardware.

5. The method as recited by claim 1, wherein determining the local interference condition includes computing the local interference condition based on algorithms stored in the user equipment.

6. The method as recited by claim 5, wherein the algorithms account for harmonics, frequencies, or known non-linearities of the user equipment.

7. The method as recited by claim 1, wherein determining the second configuration of the wireless-communication hardware includes determining that a third order intermodulation of uplink transmissions made by the user equipment does not fall into a frequency range of downlink transmissions to the user equipment.

8. The method as recited by claim 1, wherein determining the second configuration of the wireless-communication hardware includes determining that third order harmonics of uplink transmissions made by the user equipment do not fall into a frequency range of downlink transmissions to the user equipment.

9. The method as recited by claim 1, wherein the first base station and the second base station comprise a single base station.

10. A method performed by a base station, the method comprising:

receiving, by the base station and from a user equipment, a request message having contents that indicate, to the base station, one or more of a duty cycle, a transmission pattern, or a transmission time interval that the user equipment will use when transmitting first data using a first radio access technology and second data using a second radio access technology;

configuring, by the base station and based on the contents, wireless-communication hardware of the base station to receive the first data transmitted by the user equipment using the first radio access technology and the second data transmitted by the user equipment using the second radio access technology, the first and second data:

concurrently transmitted by the user equipment in accordance with a second configuration of wireless-communication hardware of the user equipment that mitigates an interference condition that is local to the user equipment; and transmitting, by the base station to another base station, the contents.

11. The method as recited by claim 10, wherein the contents further indicate, to the base station, radio access technology subcarrier scheduling parameters, and the method further comprises:

scheduling and allocating radio access technology subcarriers based on the subcarrier scheduling parameters to receive, from the user equipment, the first and second data concurrently transmitted by the user equipment in accordance with the second configuration.

12. A base station comprising:

a processor; and a non-transitory computer-readable storage media storing instructions of a base station manager application that, when executed by the processor, directs the base station to:

receive, from a user equipment, a request message having contents that indicate, to the base station, one or more of a duty cycle, a transmission pattern, or a transmission time interval that the user equipment will use when transmitting first data using a first radio access technology and second data using a second radio access technology;

configure, based on the contents, wireless-communication hardware of the base station to receive the first data transmitted by the user equipment using first radio access technology; and transmit, to another base station, the contents.

13. The base station as recited by claim 12, wherein the contents include a transmission time interval associated with the user equipment transmitting the first data.

14. The base station as recited by claim 12, wherein the contents include a transmission time interval associated with the user equipment transmitting the second data.

15. The base station as recited by claim 12, wherein the contents include a beamforming parameter associated with the user equipment transmitting the first data.

16. The base station as recited by claim 12, wherein the contents include a beamforming parameter associated with the user equipment transmitting the second data.

17. The base station as recited by claim 12, wherein the contents include subcarrier scheduling parameters for the first radio access technology.

18. The base station as recited by claim 17, wherein the base station manager application is configured to allocate subcarriers of the first radio access technology.

19. The base station as recited by claim 12, wherein the contents include subcarrier scheduling parameters for the second radio access technology.

20. The base station as recited by claim 19, wherein the base station manager application is configured to allocate subcarriers of the second radio access technology.

* * * * *